March 3, 1959

F. A. LEISEY 2,876,327

TEMPERATURE CONTROLLER

Filed Oct. 24, 1956

INVENTOR.
Frank A. Leisey
BY Everett A. Johnson
Attorney

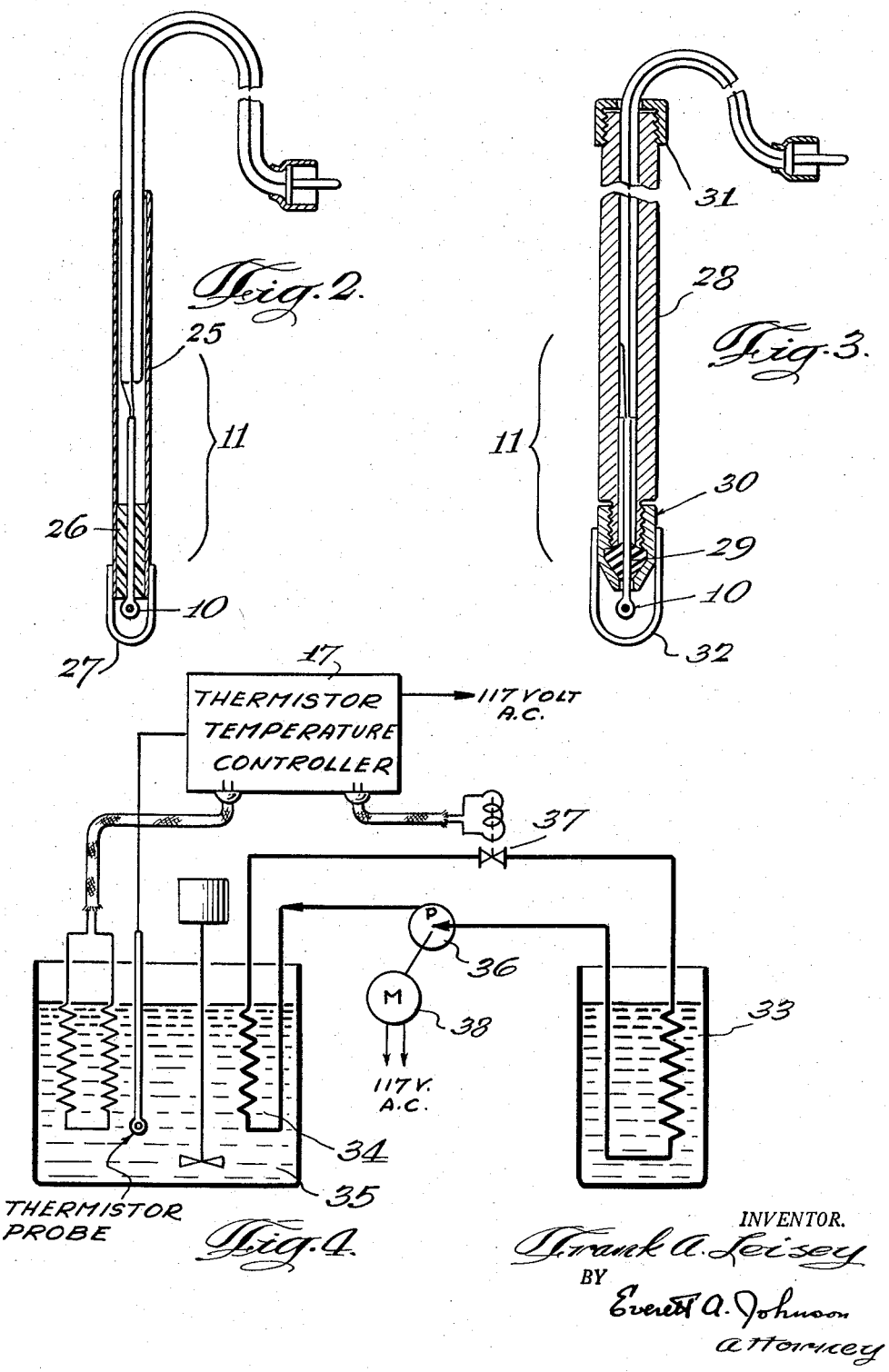

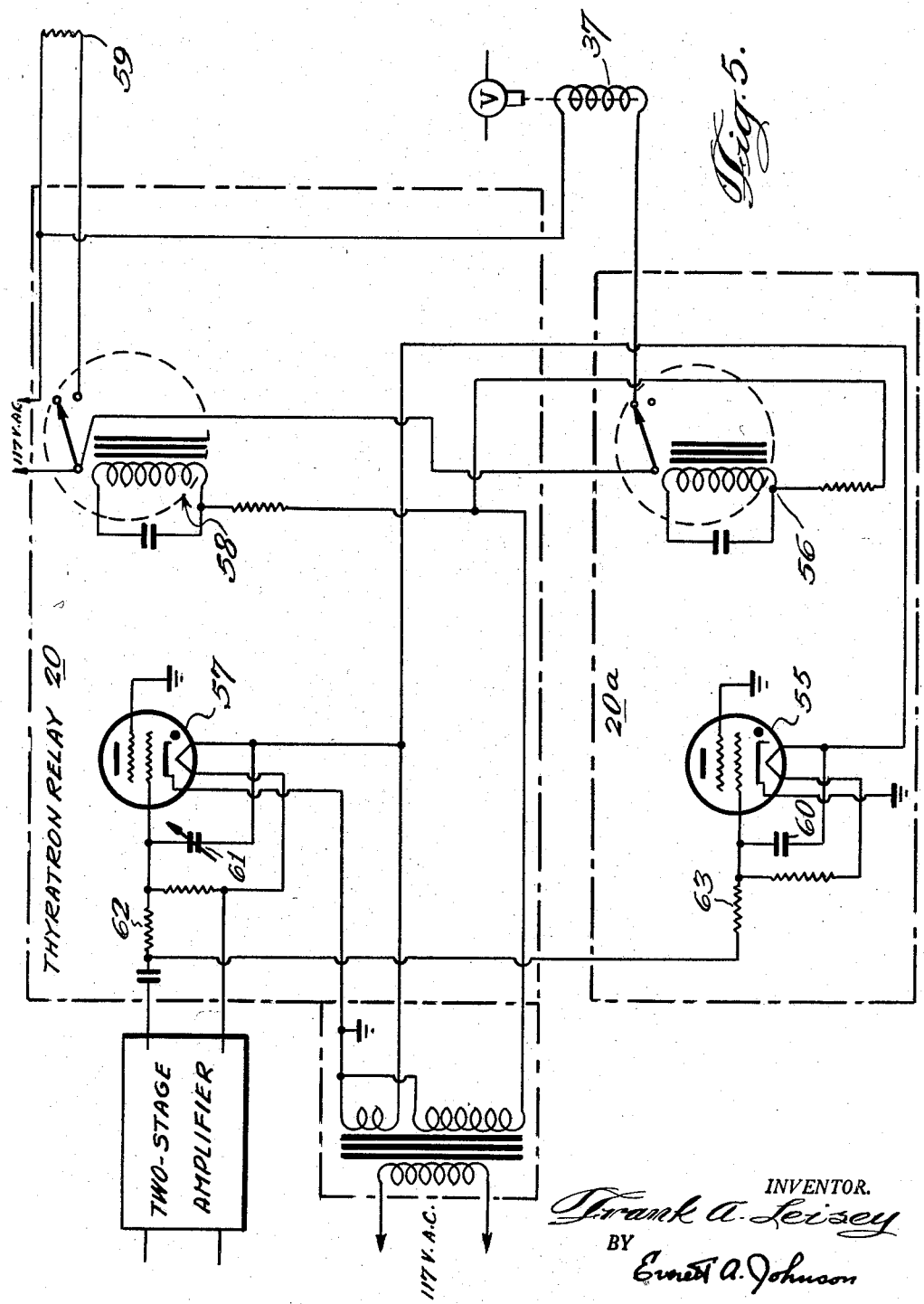

United States Patent Office 2,876,327
Patented Mar. 3, 1959

2,876,327

TEMPERATURE CONTROLLER

Frank A. Leisey, Chicago, Ill., assignor to Standard Oil Company, Chicago, Ill., a corporation of Indiana Application October 24, 1956, Serial No. 618,066

9 Claims. (Cl. 219—20)

This invention relates to apparatus for controlling constant temperature baths. More particularly, the invention relates to a compact electronic thermoregulator utilizing a thermistor as the temperature-sensitive element.

Heretofore, many types of temperature regulators have been devised, but have not been satisfactory for all purposes over wide ranges. It is, therefore, a primary object of this invention to provide a controller which is adapted to maintain a constant temperature in liquid baths over extended temperature ranges. It is a further object of the invention to provide a temperature controller which is sensitive, trouble-free and adjustable. Another object is to provide an apparatus which is comprised of inexpensive, rugged and long-life components which require little maintenance and which may be operated without special training or skills. Still another object of the invention is to provide an apparatus wherein the temperature-sensitive element can be located remotely from its associated controlling or measuring circuit. An additional object of the invention is to provide an apparatus adapted for maintaining a desired temperature differential between two zones. Another object of the invention is to provide an apparatus which is particularly suited for the purpose of controlling distillation or fractionation systems. These and other objects of the invention will become apparent as the description thereof proceeds.

Briefly, according to my invention, I have devised a measuring and controlling circuit for use with constant temperature liquid baths which employs the above advantages and avoids the difficulties referred to.

My controller comprises a balanced Wheatstone bridge assembly, a two-stage electronic amplifier, a vacuum tube relay circuit, and a thermistor as the temperature-sensitive element.

The thermistor is connected to one arm of the bridge and a variable potentiometer in another arm. The bridge is excited by 25–35 volts alternating current which is sufficiently low to effect negligible heating of the thermistor. Bridge balance will be affected by the thermistor which is placed in the bath whose temperature is to be regulated.

Thermally-responsive elements, known as thermistors, consist of semi-conductors having a negative temperature coefficient of resistance, i. e. have the characteristic of decreasing resistance with increasing temperature. The thermistors are hard, ceramic-like, semi-conductors. They are available in at least three distinct forms; beads, discs or washers, and rods. All of these types are made of various mixtures of the oxides of magnesium, nickel, cobalt, copper, uranium, iron, zinc titanium, and manganese. These mixtures of oxides are formed into the desired shapes and sintered under accurately controlled atmospheric and temperature conditions. They are characterized by being small and compact in size, are highly stable, are mechanically rugged and shock resistant, are provided with permanent electrical contacts, have a wide range of resistance to temperature coefficient and power dissipation, and have substantially unlimited life when operated within their maximum temperature ratings.

The thermistor is connected as one arm of a balanced Wheatstone bridge. Any resistance unbalance in the bridge circuit is applied to an amplifier means which greatly increases the amplitude of the unbalance voltage. This voltage then operates a thyratron relay circuit controlling the power to an electrical heater or electrical control for a cooler. If the unbalance voltage is of sufficient amplitude and in the same phase relationship as the 117 volt alternating current applied to the relay, the relay is energized, closing the circuit which applies power to the electrical heater or to the control for a cooler. As the control-point temperature is reached, the thermistor resistance balances the Wheatstone bridge and thereby turns off the bath heater or cooler.

The thermistor regulator has a temperature range extending from −100 to +575° F. with a sensitivity of ±0.05° F. of any set value in this range. Any temperature can be maintained by simply setting the bridge potentiometers. Helipots may be substituted for the potentiometers and thereby provide a wide range with greater ease of adjusmtent. Likewise, use of mercury plunger-type relay permits the control of heavy heater currents to 35 amperes where required. The thermistor elements may be mounted in copper, stainless steel or glass tubes about 0.2 inch in diameter.

Thermistors having long-time stability and the resistance of typical units changes less than 1% after aging one year. However, in the temperature controller described, any noticeable drift in thermistor resistance can be corrected by resetting the temperature set potentiometers. Further, the thermistors can be obtained in high resistance ranges so that lead resistance corrections are very small and can ordinarily be disregarded. Accordingly, the temperature-sensitive element can be located remotely from the measuring or controlling circuit components.

Further advantages and details of the invention will be described by reference to the accompanying drawings wherein:

Figures 2 and 3 show embodiments of thermistor mounting probes;

Figure 4 illustrates the use of the thermistor temperature controller of Figure 1 in controlling a bath below room temperature;

Figure 5 is a circuit diagram showing relays adapted for use in Figure 1 and Figure 4.

Figure 1:
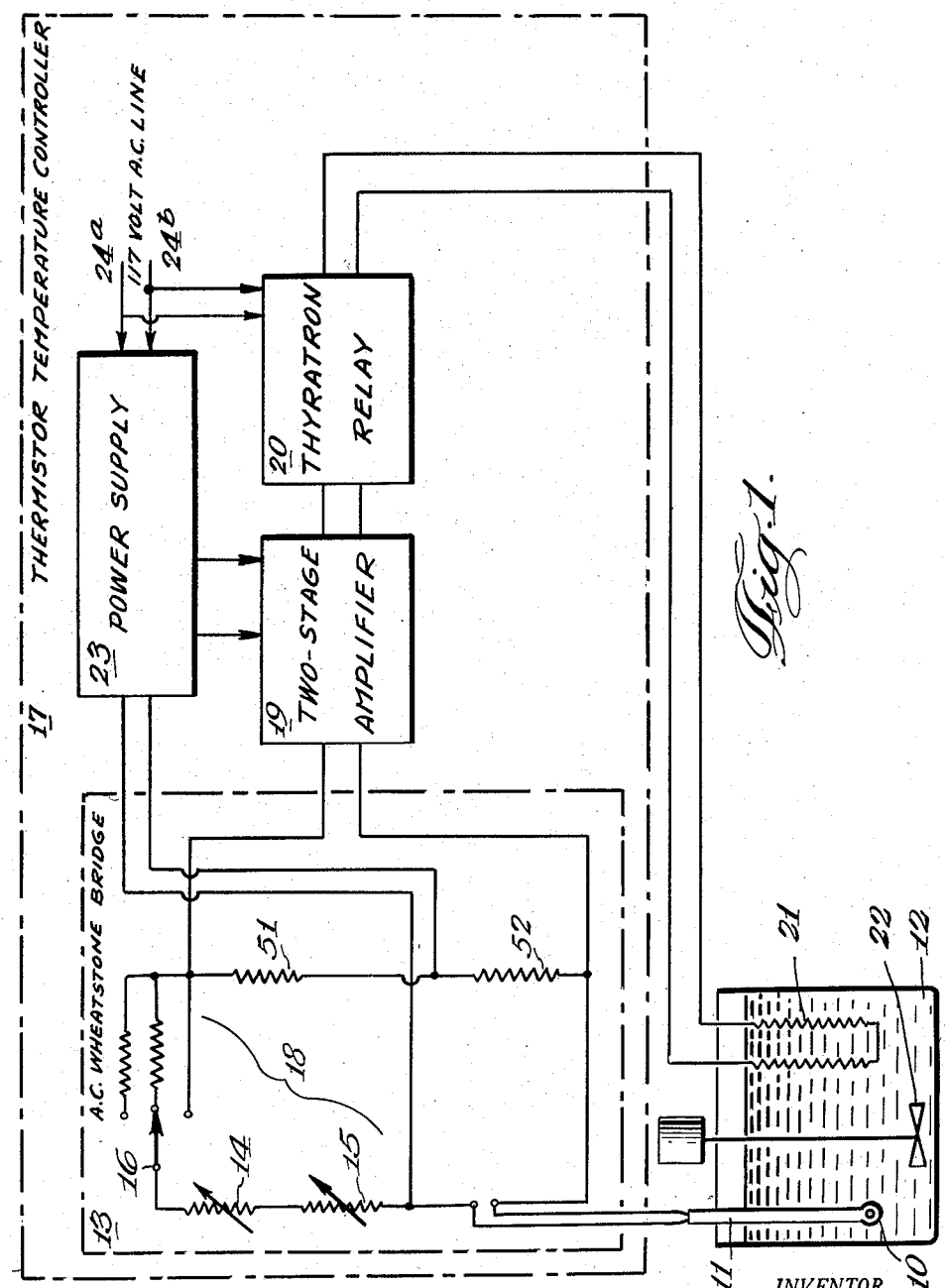
Figure 1 is a schematic representation of a typical system for controlling a heater.

Referring to the drawing Figure 1, the thermistor element 10 is mounted in a probe 11 which is suspended in the constant temperature bath 12 to be controlled. The thermistor unit 10 detects very small temperature variations and unbalances an A. C. Wheatstone bridge circuit 13 including the thermistor 10 in one arm thereof and containing variable potentiometers 14 and 15 in an adjacent arm and which are set at the desired bath operating temperature. The bridge is completed through fixed resistance arms 51 and 52.

A range switch 16 in the bridge circuit 13 of the controller 17 permits achieving a wide temperature range from about −100° F. to about +575° F., the switch 16 introducing additional resistance in the temperature adjustment arm 18 of the bridge 13.

The unbalanced voltage from the Wheatstone bridge 13 is applied to a two-stage resistance coupled amplifier 19 and the output from the amplifier 19 is applied to a thyratron discriminator relay circuit 20. The relay in relay circuit 20 controls power to the electrical heater 21 normally disposed in the bath 12. If the bath temperature decreases slightly, the controller 17 applies power to the heater 21 in order to maintain the bath temperature within very close limits. A stirring means 22 can be provided within the bath 12 in a conventional manner.

Power supply 23 supplies 25–35 volt A. C. to the bridge circuit 13 and 120 volt D. C. to the two-stage amplifier 19. One hundred and seventeen volt A. C. is supplied to the power supply 23 from lines 24a and 24b and also to the heater 21 through the relay circuit 20.

Referring to Figures 2 and 3, I have illustrated two embodiments of thermistor mounting probes 11. The probe 11 of Figure 2 comprises the thermistor 10 sealed in the bottom of a copper tube 25 with a thermo-setting plastic cement on neoprene plug 26. The thermistor bead 10 extends below the tube body 26 and a guard wire 27 surrounds the bead 10 to protect it.

In Figure 3 I have illustrated probe 11 suitable for high temperature operation and may be used in corrosive or high solvency liquids. It includes a body 28, a packing 29, the thermistor 10, and threaded fitting 30 which compresses packing 29 to seal the end of the tube 28. A threaded cap 31 closes the upper end of the tube body 28. A protective cage 32 is fixed to the threaded fitting 30 to complete the probe construction.

In Figure 1 I have described a system which comprises but a single thermistor 10. However, it is contemplated that a pair of thermistors 10 and 10a may be used, one of said thermistors being located near the heater 21 to act as an anticipator and hence provide better temperature control of the bath 12. Likewise, a thermistor-sensing element may be located immediately adjacent the heater 21 so that over ranging of the heater 21 itself will actuate a control relay on the 110 volt A. C. line 24 and operate the controller 17.

Figure 4 illustrates how the controller 17 can be set up to control a constant temperature bath below room temperature. A heat transfer media, such as naptha, is cooled in a Dry Ice-acetone bath 33 and pumped through coils 34 in the controlled bath 35. The centrifugal pump 36 runs at all times and the normally closed solenoid valve 37 controls the flow of refrigerant through the cooling coils 34. The normally closed solenoid valve 37 is actuated by the relay in the controller 17.

If desired, the solenoid valve 37 can be eliminated from the circuit and the pump motor 38 controlled by the relay in controller 17 to provide the desired controlled cooling of the controlled bath 35.

Referring to Figure 5, I have illustrated the circuit details of the relay 20 and 20a. Both relays 20 and 20a are included in the temperature controller circuit 17 of Figure 4 whereas only relay 20 is included in the embodiment of Figure 1.

When my thermoregulator is used for cooling a temperature controlled bath the thyratron relay 55 in Figure 5 will operate relay 56 which in turn applies power to solenoid valve 37 controlling the flow of coolant through the coils 34 in the bath 35 of Figure 4. As the resistance of the thermistor temperature-sensing probe 11 rises with cooling of the bath 35, the bridge circuit 13 becomes unbalanced in such a direction as to provide a positive signal on the grid of thyratron relay 55. This causes thyratron relay 55 to conduct thereby energizing relay 56 and de-energizing the solenoid of valve 37 thereby closing the valve and preventing further cooling of the bath 35.

When the ambient temperature is low and heat is required to maintain the bath at the desired temperature, thyratron relay 57 comes into operation and controls relay 58 to provide heating of the bath 35 by means of electrical resistance heater 59. The exact operating point of thyratron relay 58 is set to fire at .2° F. below the firing point of thyratron relay 55. This is accomplished by selecting the grid biasing phasing condenser 60 with respect to adjustable condenser 61. Resistors 62 and 63 are incorporated in the signal lines to isolate the individual grid biasing phasing signals from interfering with one another.

In essence I have provided two set points set .1° above the desired operating point in one case and in the other set at .1° below the desired operating point. The thyratron relay 57 operates around the lower set point to control the temperature of the bath 35 by cutting the heater 59 on and off.

The thyratron relay 58 operates at the upper control point turning on the solenoid valve 37 to permit flow of the cooling medium through the coil 34 and maintain the desired operating temperature. It will be seen that in no case do both the heating and cooling occur in the bath simultaneously, nor is one switched on immediately after the other control medium is switched off. There is a delay of .2° F. between the points where the heater 59 is switched off and the cooling coil 34 is switched on, or vice versa. Thus the inclusion of the thyratron relay circuit 20a permits maintaining close temperature control even when both heating and cooling are called upon to provide the preset temperature of bath 35.

Figure 6:
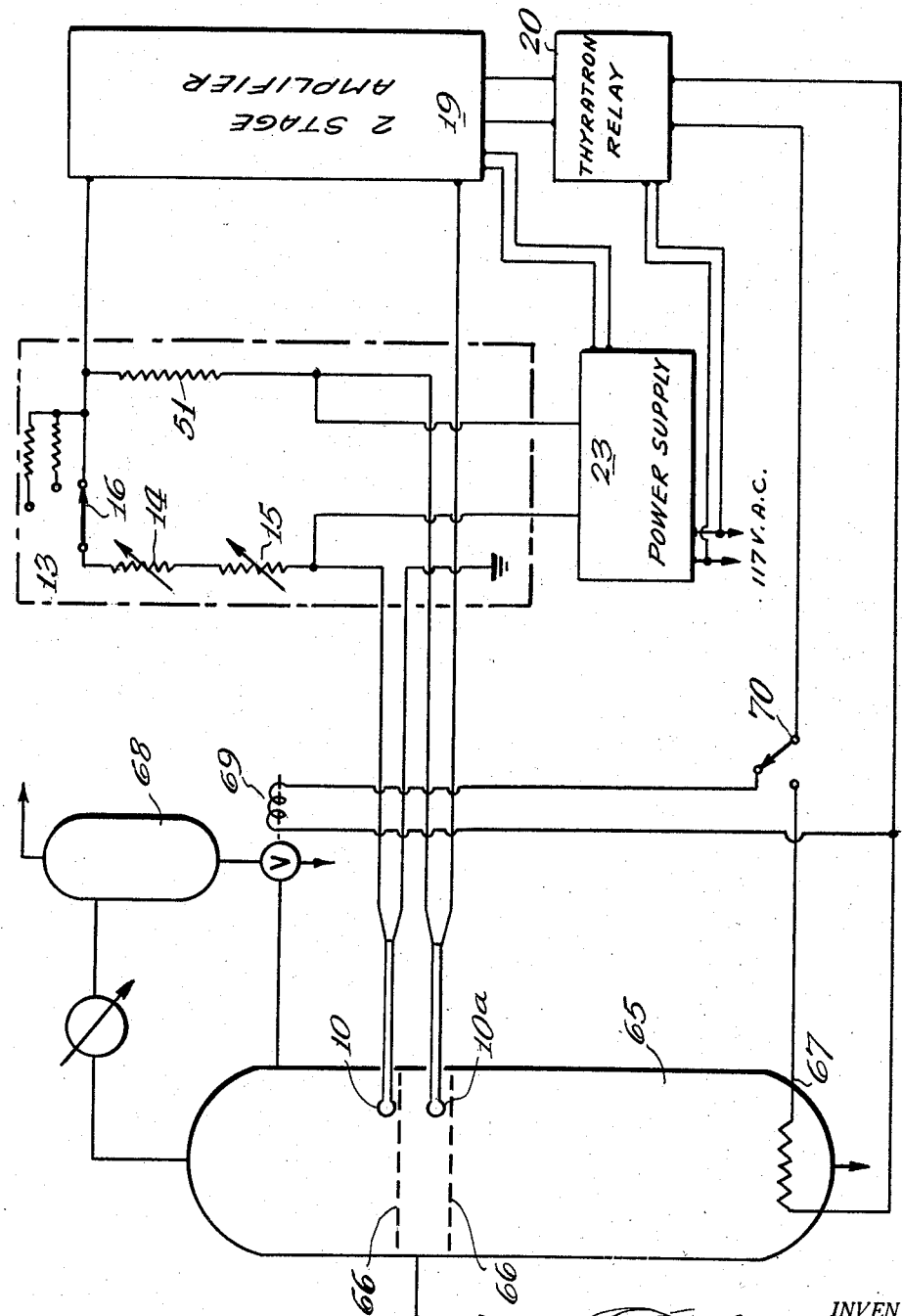
Figure 6 is a schematic representation of another embodiment of the invention for maintaining a temperature differential in a distillation system.

In Figure 6 I have illustrated an adaptation of the apparatus described in connection with Figure 1. However, the resistor 52 in Figure 1 has been replaced by a second thermistor 10a. These thermistors 10 and 10a are disposed within the tower 65 adjacent selected plates 66 so as to sense, and thereby control, a desired temperature differential between the two plates 66.

The bridge circuit 13 is similar to that illustrated in Figure 1 and includes in addition to the thermistors 10 and 10a the variable resistors 14 and 15, the range selector switch 16, and the fixed resistance 51. The power supply 23, the two-stage amplifier 19, and the thyratron relay 20, are as described above. However, the output of the relay 20 is used in the embodiment of Figure 6 to control the heater 67 at the base of the tower 65 and/or to control the reflux from the separator 68 by a solenoid valve 69, the multi-pole, multi-throw switch 70 being provided to control the heater 67 and the solenoid reflux valve 69.

From the above it will be apparent that I have achieved the objects of my invention. The thermistor temperature controller described herein is compact, has a wider range, is of fast response, has high sensitivity and is easy to operate.

Although I have described my invention by reference to preferred embodiments thereof and including particular components, it should be understood that these are by way of illustrations only. Furthermore, it is contemplated that those skilled in the art can supply appropriate amplifier and relay units which are well known and which may be arranged in the manner generally taught herein. Accordingly, the invention is not necessarily limited in scope to the described apparatus and operating technique.

What I claim is:

1. An apparatus for regulating a temperature-controlled bath which comprises in combination an A. C. Wheatstone bridge circuit, a thermally-responsive semiconductor element having a negative temperature coefficient of resistance comprising one arm of said bridge circuit, a variable potentiometer in an adjacent arm of said bridge circuit, a power supply for exciting said bridge circuit, said semi-conductor element being supported by an elongated tubular body adapted to be mounted within the bath being regulated whereby temperature changes in the bath affect the semi-conductor element resulting in bridge unbalance, amplifier means receiving the unbalance signal from the bridge circuit, vacuum tube relay means actuated by the amplified signal from said amplifier means, and temperature-modifying control means regulated by said relay.

2. The apparatus of claim 1 wherein the temperature-modifying control means comprises an electrical immersion heater and a power supply switch which is regulated by said relay.

3. The apparatus of claim 1 wherein the temperature-modifying control means comprises a solenoid valve energized by said relay, and a refrigeration system having an immersion cooling coil within said bath, said solenoid valve controlling the flow of refrigerant through said cooling coil.

4. The apparatus of claim 1 wherein the said variable potentiometer means in said Wheatstone bridge circuit comprises a pair of variable potentiometers in series, and said bridge circuit includes range switch means adapted to introduce and cut out resistances in the said adjacent arm of the bridge.

5. A controller for constant temperature fluid baths which comprises in combination a Wheatstone bridge assembly, a thermally-responsive semi-conductor means in a first arm of the bridge assembly, a pair of variable potentiometers in a second arm adjacent to said first arm, a two-stage electronic amplifier to which the signal from the Wheatstone bridge is fed, a vacuum tube relay circuit, the bridge balance being affected by the said element when placed in a bath whose temperature is to be regulated, a heater disposed in said bath, and a power supply for said heater, said supply being controlled by said vacuum tube relay.

6. A controller for constant temperature fluid baths which comprises in combination a Wheatstone bridge assembly, a thermally-responsive semi-conductor means in a first arm of the bridge assembly, a pair of variable potentiometers in a second arm adjacent to said first arm, a two-stage electronic amplifier to which the signal from the Wheatstone bridge is fed, a vacuum tube relay circuit, the bridge balance being affected by the said element when placed in a bath whose temperature is to be regulated, a heater disposed in said bath, and a power supply for said heater, said supply being controlled by said vacuum tube relay, said semi-conductor element comprising a thermistor, a tubular body, plug means adjacent one end of said body, said thermistor being mounted through said plug and extending beyond an end of said tubular body, connector leads extending from said thermistor through said plug and within said body, and a protective cage about the end of said tubular body from which said thermistor projects.

7. The controller of claim 6 wherein the said body comprises a metal tubing, and said plug is a quantity of plastic cement sealer.

8. The controller of claim 6 wherein said body is provided with a threaded fitting at one end, said plug is a compressible packing retained by said fitting, and the opposite end of the probe is closed by means of a threaded cap through which the said leads pass.

9. The controller of claim 5 wherein said bridge assembly includes a second thermally-responsive semi-conductor means in a third arm of said assembly, a range selector switch, and a fixed resistance in the fourth arm of said assembly.

References Cited in the file of this patent

UNITED STATES PATENTS

| | | |
|---|---|---|
| 1,776,901 | Essex et al. | Sept. 30, 1930 |
| 2,437,332 | Newton | Mar. 9, 1940 |
| 2,510,526 | Smith | June 6, 1950 |
| 2,645,461 | Brown et al. | July 14, 1953 |
| 2,645,700 | Morin | July 14, 1953 |
| 2,664,489 | Dickey | Dec. 29, 1953 |
| 2,728,832 | Hoffman | Dec. 27, 1955 |
| 2,760,046 | Rothacker | Aug. 21, 1956 |
| 2,761,052 | Knudsen | Aug. 28, 1956 |